United States Patent [19]

Witehira

[11] Patent Number: 5,523,644

[45] Date of Patent: Jun. 4, 1996

[54] PIEZOELECTRIC MOTION SENSOR

[76] Inventor: Pita Witehira, 34 Cowley Drive, Temple View, Hamilton, New Zealand

[21] Appl. No.: 303,140

[22] Filed: Sep. 8, 1994

Related U.S. Application Data

[63] Continuation of Ser. No. 117,336, Sep. 3, 1993, abandoned, which is a continuation of Ser. No. 689,019, Apr. 22, 1991, abandoned, which is a continuation-in-part of Ser. No. 524,325, May 16, 1990, Pat. No. 5,175,484.

[51] Int. Cl.⁶ .................................................. H01L 41/08
[52] U.S. Cl. ......................... 310/329; 310/330; 310/324
[58] Field of Search .................................... 310/319, 324, 310/330–332, 339, 348; 73/35, 517 R, 431; 493, 497, 654

[56] References Cited

U.S. PATENT DOCUMENTS

| | | |
|---|---|---|
| 406,822 | 7/1889 | Dey . |
| 1,522,613 | 1/1925 | Cole . |
| 1,924,959 | 8/1933 | Patterson, Jr. . |
| 2,831,910 | 4/1958 | Bates . |
| 2,849,629 | 8/1958 | Kissinger ................................ 310/329 |
| 3,029,301 | 4/1962 | Strider . |
| 3,242,009 | 3/1966 | Schilke . |
| 3,314,822 | 4/1967 | Jost . |
| 3,434,883 | 3/1969 | Babusci et al. . |
| 3,475,221 | 10/1969 | Jordan et al. . |
| 3,556,853 | 1/1971 | Cannone . |
| 3,631,271 | 12/1971 | Shimada ................................. 310/329 |
| 3,665,259 | 5/1972 | Brailsford ............................ 310/329 X |
| 3,911,388 | 10/1975 | Crump et al. ........................ 310/329 X |
| 4,051,397 | 9/1977 | Taylor ..................................... 310/329 |
| 4,307,602 | 12/1981 | Sawada et al. ........................ 310/329 |
| 4,814,753 | 3/1989 | Coppola ............................ 310/329 X |
| 4,972,713 | 11/1990 | Iwata ..................................... 73/517 R |
| 5,088,326 | 2/1992 | Wada et al. ......................... 310/329 X |

FOREIGN PATENT DOCUMENTS

| | | |
|---|---|---|
| 368454 | 7/1906 | France . |
| 1246427 | 12/1959 | France . |
| 1270691 | 7/1960 | France . |
| 2192386 | 2/1974 | France . |
| 2535060 | 4/1984 | France ................................. 310/329 |
| 230524 | 3/1944 | Switzerland ......................... 310/329 |
| 525374 | 8/1940 | United Kingdom . |
| 2085645 | 4/1982 | United Kingdom . |

OTHER PUBLICATIONS

Chemical Abstraces of Japan, vol. 108:59455d.
Patent Abstracts of Japan, vol. 9, No. 4 (E–366) [2041] Dec. 13, 1985.
Patent Abstracts of Japan, vol. 11, No. 4, (E–468) [2451] Jan. 7, 1981.
Patent Abstracts of Japan, vol. 11, No. 309 (E–547) [2756] Oct. 8, 1987.

*Primary Examiner*—Mark O. Budd
*Attorney, Agent, or Firm*—Knobbe, Martens, Olson & Bear

[57] ABSTRACT

A motion sensor includes a piezoelectric transducer and a ball positioned against the transducer, with the ball rollably engaged with the transducer. The transducer generates an electrical signal in response to motion of the ball on the transducer. In a preferred embodiment, the transducer includes a piezoelectric ceramic composite disc which is bonded to a metallic, preferably brass, plate. The ball is positioned against the brass plate for rolling engagement of the ball on the brass plate. When motion of the ball relative to the transducer occurs, the low frequency rolling movement of the ball on the transducer induces the transducer to generate an electrical signal. In an alternate embodiment, the ball is dispensed with, and the transducer is suspended beneath a circuit board by a stiff wire connected to a first end of the transducer and a flexible wire connected to a second end of the transducer. Both wires are attached to the circuit board, so that the transducer can vibrate about its first end in response to movement of the sensor.

28 Claims, 2 Drawing Sheets

5,523,644

PIEZOELECTRIC MOTION SENSOR

RELATED APPLICATIONS

This application is a continuation of application Ser. No. 08/117,336, filed Sep. 3, 1993, now abandoned, which is a continuation of application Ser. No. 07/689,019, filed Apr. 22, 1991, which is a continuation in part of application Ser. No. 07/524,325, May 16, 1990, now U.S. Pat. No. 5,175,484.

FIELD OF THE INVENTION

The present invention relates generally to motion sensors. More particularly, the present invention relates to sensors which can detect mechanical motion and produce an electrical signal representative of the motion. The present invention particularly, though not exclusively, pertains to motion sensors which can produce an electrical signal in response to motion of a vehicle, to indicate motion of the vehicle.

BACKGROUND

A large number of applications exist in which it is desirable to activate or enable an electronic or computer circuit when a particular object, e.g., a vehicle, undergoes motion. For example, U.S. patent application Ser. No. 524,325 for an invention entitled "Electrical Power Distribution System" assigned to the same assignee as the present invention, discloses an automotive electrical system which can be enabled by a motion sensor. More particularly, as described in the U.S. Patent application referenced above, a preselected portion of a car battery is activated to crank the engine of the car only upon motion of the car, such as what occurs when a person sits down in the driver's seat of the car, to conserve the stored energy in the preselected battery portion.

While the above-referenced U.S. Patent application discloses one application for a motion sensor, it will be appreciated that many more applications exist in which it is desirable to sense the motion of an object and to produce an electrical signal which is representative of the motion. Regardless of the particular application of the motion sensor, it is ordinarily preferred that the motion sensor be relatively inexpensive, rugged, and reliable. It is further preferred and indeed often required that the motion sensor transduce detected mechanical motion into an electrical signal that can advantageously be used in an electrical circuit.

One type of inexpensive, comparatively rugged sensor that can transduce mechanical vibration of the sensor into an electrical signal output is a piezoelectric crystal. More particularly, certain materials, known as piezoelectric materials, generate an electrical voltage signal when the atoms of the crystalline structure of the material which make up the material are disturbed.

The disturbance of the atoms can be caused by, among other things, a pressure wave impinging upon the material. To sense pressure waves of relatively small amplitudes, it is necessary that the pressure wave have a frequency that is at or near the resonant frequency of vibration of the particular piezoelectric structure. It happens that audible sound waves typically exhibit frequencies that are at or near the resonant frequency of vibration of many piezoelectric structures.

As the frequency of a source of an atomic disturbance having a relatively small amplitude decreases to a value substantially below the resonant frequency of vibration of the piezoelectric structure, however, the amplitude of the output electrical signal generated by the structure may decrease to a value which is insufficient to support processing of the signal. Such a low frequency, small amplitude disturbance can be caused by, for example, motion of a vehicle in which the piezoelectric structure is mounted. The present invention recognizes that relatively small, low frequency disturbances of a piezoelectric structure can nevertheless be detected by a motion sensor which operates on the principle of piezoelectricity.

Accordingly, it is an object of the present invention to provide a piezoelectric motion sensor which can sense motion having a comparatively low frequency. It is another object of the present invention to provide a piezoelectric motion sensor that can be used to detect motion of a vehicle. A further object of the present invention is to provide a piezoelectric motion sensor that is relatively easy to use and comparatively cost-effective to manufacture.

SUMMARY

A motion sensor includes a piezoelectric transducer and a ball positioned against the transducer, with the ball movably engaged with the transducer. The transducer generates an electrical signal in response to motion of the ball on the transducer. In one preferred application, the motion sensor can be mounted on a vehicle so that the motion of the ball is caused by motion of the vehicle.

In a preferred embodiment, the transducer includes a piezoelectric ceramic composite disc which is bonded to a metallic, preferably brass, plate. The piezoelectric disc establishes the positive pole of the transducer, and the brass plate establishes the negative pole. Preferably, the ball is positioned against the brass plate for rolling engagement of the ball on the brass plate. When motion of the ball relative to the transducer occurs, the low (less than about ten Hertz) frequency rolling movement of the ball on the transducer induces the transducer to generate an electrical signal. This electrical signal is conducted via first and second electrical leads that are respectively connected to the positive and negative poles of the transducer to an electrical circuit for processing of the signal.

In one preferred embodiment, a circular plastic bracket is attached to the transducer to prevent the ball from moving past the periphery of the brass plate and off of the transducer. Also, a surface, e.g., a circuit board, can be positioned over the transducer to prevent the ball from falling away from the transducer when the motion is fully inverted, i.e., when the motion sensor is oriented such that the ball is directly underneath the transducer.

In another aspect of the invention, the ball of the motion sensor is dispensed with, and the transducer of the motion sensor is distanced from a circuit board and is connected to the circuit board for vibration of the transducer relative to the circuit board. When the transducer is caused to vibrate relative to the circuit board, the transducer generates an electrical signal in response to the motion of the transducer. Vibrational motion of the transducer can be induced by jolts, shocks, or other physical motion of the platform on which the motion sensor is mounted, and the vibrational motion of the transducer is amplified by a counterweight which is attached to the transducer.

Specifically, a stiff wire is soldered to the circuit board and to the metallic plate of the transducer near a first end of the transducer to hold the first end of the transducer substantially stationary with respect to the circuit board. Further, a flexible wire is soldered to the piezoelectric element near a second end of the transducer which is opposite to the first, end. This flexible wire is also soldered to the circuit board. Thus, the second end of the transducer is connected to the circuit board, and the flexibility of the wire permits vibrational motion of the second end relative to the circuit board. Preferably, a counterweight is soldered to the transducer near the second end of the transducer to mechanically amplify vibrations of the transducer. When the transducer vibrates, it generates and electrical signal in response. The signal from the transducer is conducted to the circuit board via the stiff wire and flexible waire for further processing.

The details of the structure of the present invention, as well as the operation of the invention, can best be understood in reference to the accompanying drawings, in which like numerals refer to like parts.

DESCRIPTION OF THE PREFERRED EMBODIMENT

Figure 1:
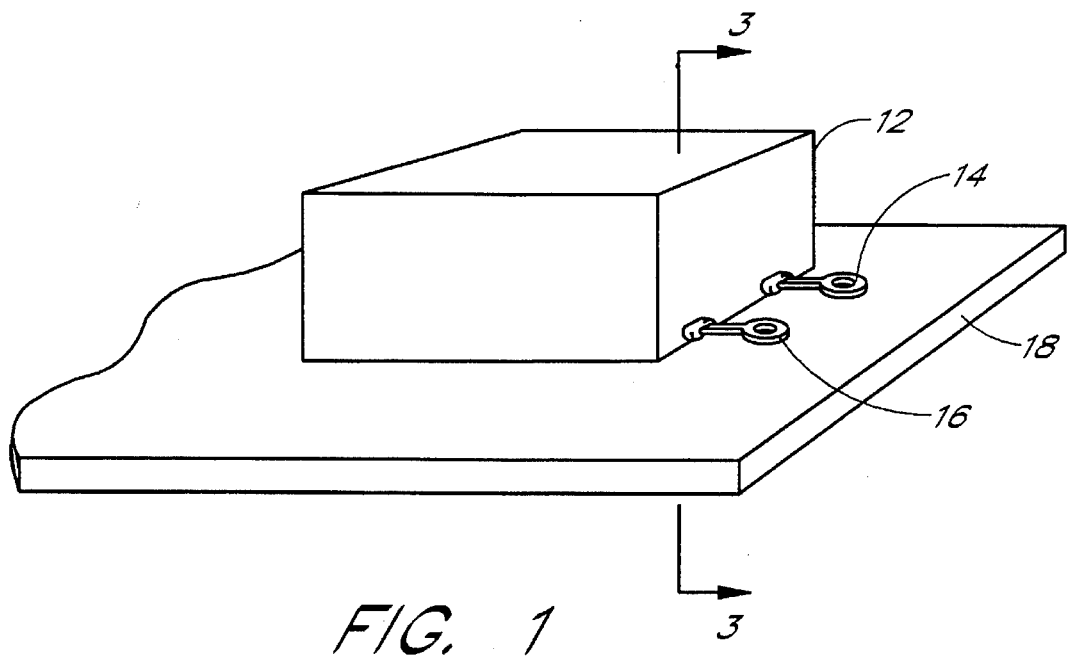
FIG. 1 is a perspective view of the novel motion sensor of the present invention.

Referring initially to FIG. 1, a plastic or lightweight insulated metal case 12 is shown. Case 12 is hollow, and a motion sensor, shown in FIG. 2 and generally designated 10, is held within the case 12. As shown in FIG. 1, two electrical connectors 14, 16 are connected to the case 12 and extend therethrough to join an electrical circuit (not shown) within the case 12, to transmit electrical signals from the circuit to other electrical equipment, as more fully disclosed below. As further shown in FIG. 1, the case 12 may be disposed on a surface 18. It is to be understood that the surface 18 may be any movable surface, such as a surface of an automobile (not shown), watercraft (not shown), or aircraft (not shown).

Figure 2:
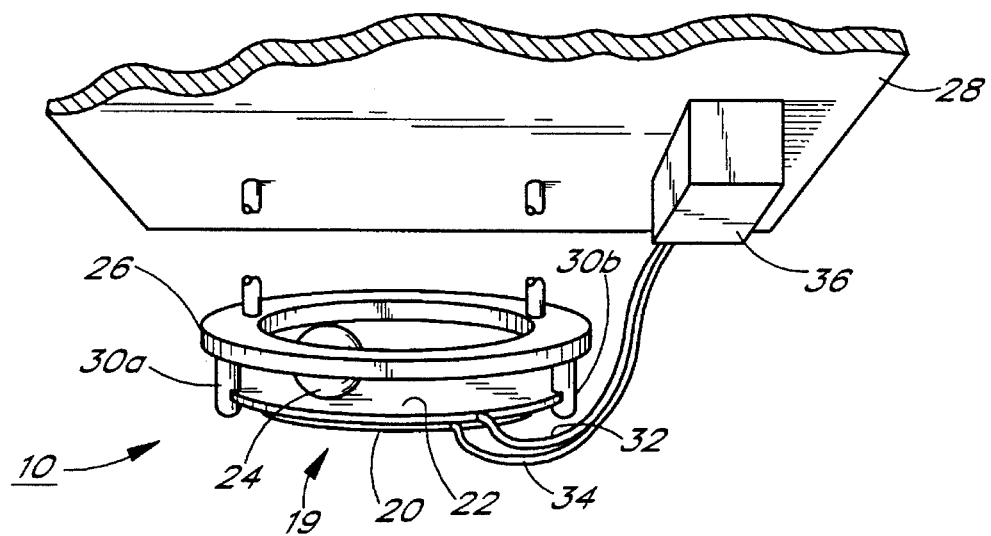
FIG. 2 is a perspective view of one presently preferred embodiment of the novel motion sensor of the present invention, with the casing removed and portions broken away for clarity.
Figure 3:
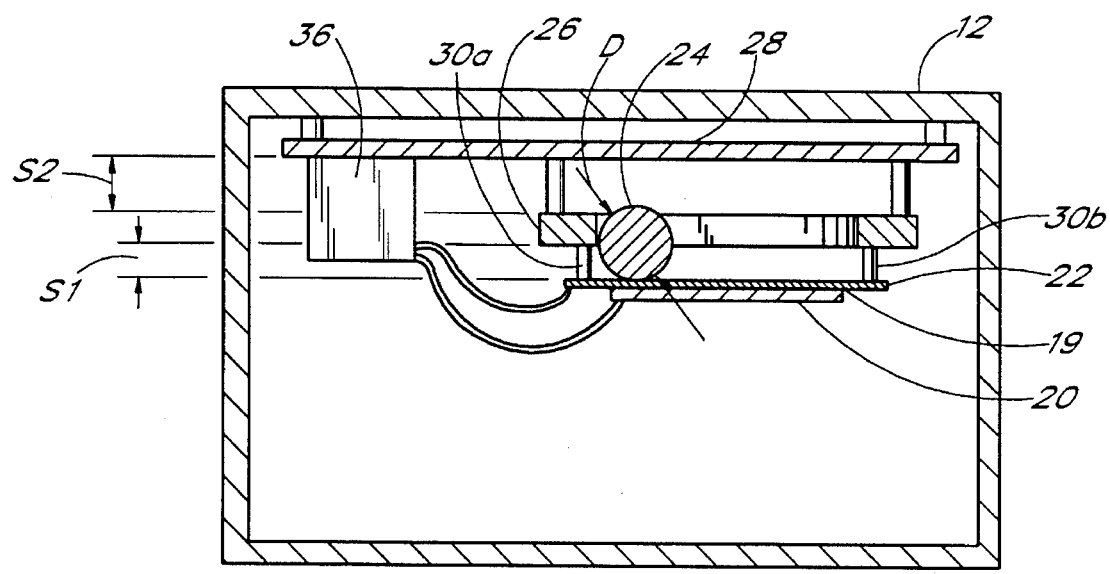
FIG. 3 is a cross-sectional view of the novel motion sensor of the present invention, as seen along the line 3—3 of FIG. 1.

The details of the motion sensor 10 can best be seen in cross-reference to FIGS. 2 and 3. As shown, the motion sensor 10 includes a transducer 19 that comprises a piezoelectric disc 20 and a metallic plate 22. Preferably, the disc 20 is made of a composite ceramic piezoelectric material, and the plate 22 is made of brass. As can be appreciated in reference to FIGS. 2 and 3, the disc 20 is bonded to the metallic plate 22 by any means well-known in the art, such as solvent bonding. It will be further appreciated by the skilled artisan that the disc 20 establishes the positive electrical pole of the transducer 19, and the plate 22 establishes the negative electrical pole of the transducer 19.

FIGS. 2 and 3 further show that the motion sensor 10 includes a ball 24 which is positioned on the plate 22 and which can move on the plate 22. Specifically, the ball 24 is held on the plate 22 by gravity, and is rollably engaged with the plate 22. While FIGS. 2 and 3 show that the ball 24 is positioned on the plate 22, it is to be appreciated that alternatively the motion sensor 10 can be inverted and the ball 22 positioned on the disc 20. As shown, however, the ball 24 is preferably positioned on the plate 22, because the plate 22 has relatively better resistance to wear from contact with the ball 24 than does the disc 20.

Preferably, the ball 24 is a relatively heavy ball, such as a steel ball. In one preferred embodiment, the ball 24 is a three millimeter (3mm) diameter steel ball. In accordance with the present invention, the mechanical loading of the ball 24 on the transducer 19 reduces the resonant frequency of vibration of the transducer 19. While FIGS. 2 and 3 show a presently preferred embodiment in which a ball 24 is engaged with the transducer 19, it is to be understood that any suitably shaped object may be used in place of the ball 24 to induce deflections of the transducer 19. For example, a cylindrically-shaped object (not shown) may be positioned against the transducer 19 for rolling engagement therewith when the motion sensor 10 is moved.

Still referring to FIGS. 2 and 3, the motion sensor 10 is shown to include means for limiting motion of the ball 24 relative to the plate 22. More particularly, an annular bracket 26 is attached to a suitable surface, such as the circuit board 28 shown in FIGS. 2 and 3. In one preferred embodiment, the bracket 26 is made of hard plastic, and the circuit board 28 is made of a suitable electrically resistive material. Also, the bracket 26 is attached to the plate 22 by a plurality of posts (posts 30a, 30b shown in FIGS. 2 and 3), which can advantageously be formed integrally with the bracket 26.

As shown best in FIG. 2, the bracket 26 lies substantially parallel to and above the periphery of the plate 22. Also, as shown in FIG. 3, the bracket 26 is positioned from the plate 22 a distance "s1" which is less than the diameter "D" of the ball 24. Moreover, the circuit board 28 is positioned a distance "s2" from the bracket 26 that is less than the diameter "D" of the ball 24. It can therefore be appreciated in reference to FIGS. 2 and 3 that the bracket 26, in combination with the circuit board 28, limits the motion of the ball 24 relative to the plate 22. More specifically, the bracket 26 prevents the ball 24 from rolling off of the peripheral edge of the plate 22. Also, the circuit board 28 functions as a retainer to prevent the ball 24 from becoming distanced, by more than a few millimeters, from the plate 22 in the event that the case 12 with motion sensor 10 is inverted relative to the orientation shown in the Figures.

Additionally, as shown best in FIG. 2, a first electrical lead 32 is electrically connected to the plate 22, and a second electrical lead 34 is electrically connected to the disc 20. The leads 32, 34 are in turn electrically connected to an electrical circuit 36, which is mounted on the circuit board 28. Electrical circuit 36 processes the electrical signal generated by the transducer 19. One preferred embodiment of the electrical circuit 36 is disclosed in U.S. patent application Ser. No. 524,325 for an invention entitled "Electrical Power Distribution System", assigned to the same assignee as the present invention. It is to be understood that while the case 12 is attached to the surface 18 in the substantially horizontal (with respect to the earth) orientation shown in FIG. 1, the case 12 can alternatively be attached to the surface 18 in other orientations, as long as the force of gravity is sufficient to hold the ball 24 on the plate 22.

In the operation of the motion sensor 10, reference is made to FIGS. 1 and 2. In the event that the surface 18 is translationally or rotationally accelerated, or is vibrationally moved or jolted, the ball 24 is caused to move relative to the transducer 19. More particularly, movement of the surface 18 will cause the ball 24 to roll on the plate 22. As the ball 24 rolls on the plate 22, the ball 24 induces the transducer 19 to generate a voltage potential in response between the plate 22 and the disc 20 (and, hence, between the leads 32, 34). Specifically, movement of the ball 24 on the plate 22 induces a mechanical deflection in the disc 20. In response to the deflection of the disc 20, the disc 20 generates a voltage signal between the disc 20 and the plate 22. This voltage signal is accordingly representative of movement of the ball 24 with respect to the transducer 19. The signal generated by the transducer 19 is conducted from the transducer 19 via the leads 32, 34 to the electrical circuit 36, for further processing.

Figure 4:
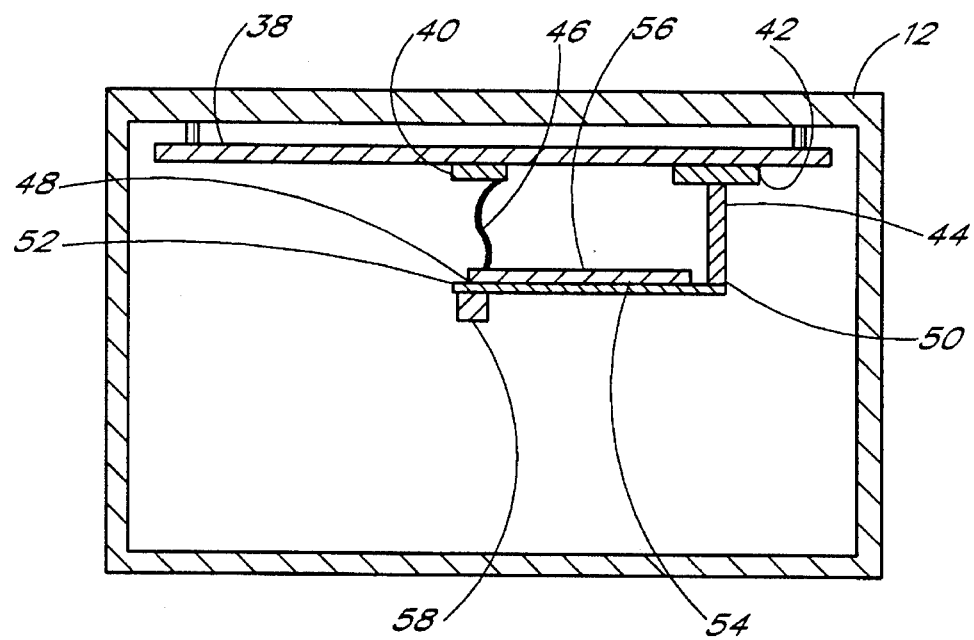
FIG. 4 shows an alternate embodiment of the novel motion sensor of the present invention, as would be seen along the line 3—3 in FIG. 1.

Now referring to FIG. 4, an alternate embodiment of the motion sensor 10 is shown to include a surface, e.g., a circuit board 38. As shown in FIG. 4, the circuit board 38 may advantageously include electrical components 40, 42 which are mounted on the circuit board 38 in accordance with principles well-known in the art. The components 40, 42 may be portions of a signal processing circuit, such as the circuit disclosed in the above-cited U.S. patent application Ser. No. 524,325. As further shown in FIG. 4, a stiff wire 44 is physically and electrically connected to the component 42, e.g., by soldering the stiff wire 44 to the component 42. Likewise, a flexible wire 46 is physically and electrically connected to the component 40.

As shown in FIG. 4, a piezoelectric transducer 48 is distanced from the circuit board 38 and is physically and electrically attached to the circuit board 38 for permitting vibrational motion of the transducer 48 relative to the circuit board 38 and for transmitting signals from the transducer 48 to the circuit board 38. Specifically, the stiff wire 44 is attached to a first end 50 of the transducer 48, and the flexible wire 46 is attached to a second end 52 of the transducer 48 the is opposite to the first end 50. More specifically, the stiff wire 44 is attached to a metallic plate 54 of the transducer 48, to rigidly hold the first end 50 substantially stationary with respect to the circuit board 38. Also, the flexible wire 46 is attached to a piezoelectric element 56 of the transducer 48. Preferably, the stiff and flexible wires 44, 46 are soldered to the transducer 48.

In accordance with the embodiment shown in FIG. 4, the plate 54 and element 56 may have any physical configuration conducive for permitting vibrational motion of the second end 52 of the transducer 48. For example, both the plate 54 and the element 56 may be shaped as discs, or elongated paralellepipeds. Furthermore, while FIG. 4 shows that the transducer 48 is suspended beneath the circuit board 38, it is to be understood that the present invention envisions other orientations of the transducer 48 relative to the circuit board 38 that may be conducive to vibrational motion of the transducer 48. It is to be further understood that regardless of their configuration, the metallic plate 54 establishes the negative pole of the transducer 48, and the piezoelectric element 56 establishes the positive pole of the transducer 48. Accordingly, both the negative and positive poles of the transducer 48 are electrically connected to the respective electrical components 42, 40 by the respective stiff and flexible wires 44, 46. Thus, in accordance with the disclosure above, the component 42 establishes electrical ground.

FIG. 4 also shows that a counterweight 58 is attached to the transducer 48 near the second end 52 of transducer 48. The counterweight 58 may advantageously be a mass of solder material that is soldered to the metallic plate 54 near the second end 52 of the transducer 48. As the skilled artisan will appreciate, the counterweight 58 amplifies vibrations of the transducer 48.

In the operation of the embodiment shown in FIG. 4, when the case 12 is moved, the transducer 48 will vibrate. More particularly, the second end 52 of the transducer 48 will tend to vibrate with respect to the circuit board 38 in response to motion of the case 12, such as what can occur when the surface on which the case 12 is mounted is jarred or accelerated. Vibrational motion of the transducer 48 is amplified by the effect of the counterweight 58. In response to the vibrational deflections of the transducer 48, the transducer 48 generates an electrical signal. Specifically, the piezoelectric element 56 generates an electrical signal in response to deflections of the element 56. Such deflections of the element 56 can be caused by, for example, vibration of the transducer 48. The signal from the piezoelectric element 56 is conducted via the flexible wire 46 to the electrical component 40 for further processing.

While the particular motion sensor as herein described in detail is fully capable of achieving the objects set forth above, it is to be understood that the scope of the present invention is not to be limited by anything other than the recitation of structure set forth in the appended claims.

I claim:

1. A motion sensor for generating an electrical signal representative of motion of the sensor, the motion sensor comprising:

a piezoelectric transducer having a positive pole and a negative pole;

an object positioned adjacent said transducer for rolling engagement therewith, said transducer generating an electrical signal in response to motion of said object relative to said transducer;

a first surface parallel to said transducer to constrain said object proximate to said transducer between said transducer and said first surface;

a bracket positioned between said transducer and said first surface, said bracket being fixedly attached to said first surface by a first plurality of supports and to said transducer by a second plurality of supports, and having an interior face which defines an internal opening to further constrain said object within said opening and an electrical circuit for conducting said signal from said poles of said transducer to said circuit.

2. The motion sensor recited in claim 1, wherein said transducer includes a piezoelectric disc bonded to a metallic plate, and said object is a ball.

3. The motion sensor recited in claim 2, wherein said piezoelectric disc is made of a composite ceramic and said metal plate is made of brass.

4. The motion sensor of claim 3, wherein said ball is positioned against said metal plate.

5. A motion sensor, comprising:

a piezoelectric transducer for generating an electrical signal in response to a vibration having a frequency of less than about ten Hertz wherein said transducer has first and second ends;

a surface; and inducing means comprising:

a stiff wire rigidly connecting said first end of said tranducer to said surface for permitting vibrational motion of said second end of said transducer relative to said surface; and a flexible wire connecting said second end of said transducer to said surface, said flexible wire communicating electrical signals from the transducer.

6. The motion sensor of claim 5, further comprising a counterweight attached to said transducer near said second end.

7. A motion sensor, comprising:

a piezoelectric transducer;

a ball positioned adjacent said transducer for rolling engagement of said ball with said transducer, said transducer generating an electrical signal in response to motion of said ball relative to said transducer; and an electrical circuit board with an electrical circuit thereon for processing said electrical signal from said transducer, said electrical circuit board spaced apart from said transducer and substantially parallel with said transducer to confine said ball between said electrical circuit board and said transducer so that said ball remains on or proximate to transducer.

8. The motion sensor recited in claim 7, wherein said transducer has a piezoelectric ceramic disc establishing a positive pole and a metallic plate bonded to said disc establishing a negative pole, and said sensor further comprises:

a first electrically conductive wire electrically connected to said positive pole and said circuit; and a second electrically conductive wire electrically connected to said negative pole and ground;

wherein at least one of said wires conducts said signal from said transducer to said electrical circuit.

9. The motion sensor recited in claim 8, wherein said electrical circuit board supports said transducer.

10. A motion sensor, which comprises:

a surface for supporting an electric component thereon;

a piezoelectric transducer, having a surface, physically connected to said supporting surface and electrically connected to said electronic component, wherein said transducer has first and second ends; and means for inducing deflections of said motion sensor, said inducing means including a stiff wire rigidly connecting said first end of said transducer to said supporting surface for permitting vibrational motion of said second end of said transducer relative to said supporting surface and a flexible wire connecting said second end of said transducer to said supporting surface, said flexible wire further electrically connecting said transducer to said electric component.

11. The motion sensor of claim 10, wherein said second end of said motion sensor has a greater mass than said first end of said motion sensor.

12. The sensor of claim 1, wherein said opening is smaller in area than said transducer.

13. The sensor of claim 1, wherein said bracket is annular.

14. The sensor of claim 1, wherein said supports are cylindrical.

15. The sensor of claim 1, wherein said opening is substantially rounded.

16. The sensor of claim 15, wherein said opening is circular.

17. The sensor of claim 1, wherein said object has a diameter and said bracket is spaced apart from said transducer at a distance less than the diameter of said object.

18. The sensor of claim 17, wherein said bracket is spaced apart from said transducer at a distance less than one-half the diameter of said object.

19. The sensor of claim 17, wherein said bracket is spaced apart from said first surface at a distance substantially the same as the distance from the bracket to the transducer.

20. A motion sensor for generating an electrical signal representive of motion of the sensor, the motion sensor comprising:

a piezoelectric transducer having a positive pole and a negative pole;

an object positioned adjacent said transducer for rolling engagement therewith, said transducer generating an electrical signal in response to motion of said object relative to said transducer;

a first surface positioned parallel to said transducer to constrain said object proximate to said transducer between said transducer and said first surface;

a bracket located between said transducer and said first surface, wherein said bracket is attached to said first surface and said transducer by a plurality of supports, and wherein said bracket has an interior race defining an internal opening to further constrain said object within said opening; and an electrical circuit for conducting said signal from said poles of said transducer to said circuit.

21. The sensor of claim 20, wherein said opening is smaller in area than said transducer.

22. The sensor of claim 20, wherein said bracket is annular.

23. The sensor of claim 20, wherein said bracket is positioned parallel to said first surface.

24. The sensor of claim 20, wherein said opening is substantially rounded.

25. The sensor of claim 24, wherein said opening is circular.

26. The sensor of claim 20, wherein said object has a diameter and said bracket is spaced apart from said transducer at a distance less than the diameter of said object.

27. The sensor of claim 20, wherein said bracket is spaced apart from said transducer at a distance less than one-half the diameter of said object.

28. The sensor of claim 20, wherein said supports are cylindrical.

* * * * *

UNITED STATES PATENT AND TRADEMARK OFFICE
CERTIFICATE OF CORRECTION

PATENT NO. : 5,523,644
DATED : June 4, 1996
INVENTOR(S) : Pita Witehira

It is certified that error appears in the above-indentified patent and that said Letters Patent is hereby corrected as shown below:

Column 8, line 27, change "interior race defining" to --interior face defining--.

Signed and Sealed this

Seventeenth Day of December, 1996

Attest:

BRUCE LEHMAN

*Attesting Officer*        *Commissioner of Patents and Trademarks*